(12) United States Patent
Zhang et al.

(10) Patent No.: US 9,186,852 B2
(45) Date of Patent: Nov. 17, 2015

(54) FIBER-CONTAINING PREPREGS AND METHODS AND SYSTEMS OF MAKING

(71) Applicant: Johns Manville, Denver, CO (US)

(72) Inventors: Mingfu Zhang, Highlands Ranch, CO (US); Klaus Friedrich Gleich, Highlands Ranch, CO (US); Asheber Yohannes, Littleton, CO (US); Michael J. Block, Centennial, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 7 days.

(21) Appl. No.: 14/278,484

(22) Filed: May 15, 2014

(65) Prior Publication Data

US 2015/0144253 A1    May 28, 2015

Related U.S. Application Data

(63) Continuation-in-part of application No. 14/088,034, filed on Nov. 22, 2013.

(51) Int. Cl.
| | |
|---|---|
| *B29C 70/52* | (2006.01) |
| *B29C 47/10* | (2006.01) |
| *C08J 5/04* | (2006.01) |
| *C08J 5/06* | (2006.01) |
| *B29B 15/12* | (2006.01) |
| *B29C 70/50* | (2006.01) |
| *C08J 5/24* | (2006.01) |

(52) U.S. Cl.
CPC ............... *B29C 70/52* (2013.01); *B29B 15/122* (2013.01); *B29C 47/10* (2013.01); *B29C 70/50* (2013.01); *C08J 5/04* (2013.01); *C08J 5/06* (2013.01); *C08J 5/24* (2013.01); *C08J 2377/02* (2013.01)

(58) Field of Classification Search
CPC ............................... B29C 70/52; B29C 47/10
USPC ............................ 156/148, 166, 180
See application file for complete search history.

(56) References Cited

U.S. PATENT DOCUMENTS

| | | | |
|---|---|---|---|
| 3,323,945 A | | 6/1967 | Hechelhammer et al. |
| 3,849,154 A | | 11/1974 | Michael et al. |
| 4,528,223 A | * | 7/1985 | Kumazawa et al. ......... 428/34.5 |

(Continued)

FOREIGN PATENT DOCUMENTS

| | | |
|---|---|---|
| CA | 1221216 A1 | 5/1987 |
| DE | 10 2007 031 467 A1 | 1/2009 |

(Continued)

*Primary Examiner* — Jeff Aftergut
(74) *Attorney, Agent, or Firm* — Robert D. Touslee

(57) ABSTRACT

Methods of making a fiber-containing prepregs may include drawing unsized fibers from a batch of molten glass. The method may also include applying a sizing composition to the unsized fibers to form a plurality of sized fibers, where the sizing composition includes a first polymerization agent for polymerizing caprolactam. The method may further include weaving the plurality of sized fibers into a fabric. Another step may include melting a reactive resin composition to form a melted reactive resin composition, where the reactive resin composition may include caprolactam. The melted reactive resin composition may be applied to the fabric. The method may further include heating the fabric and the melted reactive resin composition to a polymerization temperature, where the caprolactam polymerizes to form a fiber-resin amalgam including a polyamide. Another step may be to form the fiber-resin amalgam into the fiber-containing prepreg.

16 Claims, 7 Drawing Sheets

(56) References Cited

U.S. PATENT DOCUMENTS

| | | |
|---|---|---|
| 5,294,461 A | 3/1994 | Ishida |
| 5,374,385 A | 12/1994 | Binse et al. |
| 5,424,388 A | 6/1995 | Chen et al. |
| 5,492,755 A | 2/1996 | Binse et al. |
| 5,837,181 A | 11/1998 | Leimbacher et al. |
| 5,895,808 A | 4/1999 | Schmid et al. |
| 5,980,796 A | 11/1999 | Nussdorfer et al. |
| 6,283,166 B1 * | 9/2001 | Miyasato et al. ......... 139/383 R |
| 6,369,157 B1 | 4/2002 | Winckler et al. |
| 6,436,548 B1 | 8/2002 | Phelps |
| 6,713,601 B2 | 3/2004 | Phelps |
| 7,151,143 B2 | 12/2006 | Wang et al. |
| 7,790,284 B2 | 9/2010 | Davies |
| 7,824,770 B2 | 11/2010 | Honma et al. |
| 8,293,322 B2 | 10/2012 | Burghardt et al. |
| 8,394,731 B2 * | 3/2013 | Sato et al. .................... 442/301 |
| 2004/0188883 A1 | 9/2004 | Barron et al. |
| 2005/0214465 A1 | 9/2005 | Maskus et al. |
| 2009/0246468 A1 | 10/2009 | Schubiger |
| 2010/0040857 A1 | 2/2010 | Schubiger |
| 2010/0215920 A1 | 8/2010 | Orange et al. |
| 2010/0280239 A1 * | 11/2010 | Shooshtari et al. ........... 540/487 |
| 2010/0305269 A1 | 12/2010 | Gleich et al. |
| 2011/0045275 A1 * | 2/2011 | Tadepalli et al. ............. 156/245 |
| 2012/0107509 A1 | 5/2012 | Scherzer et al. |
| 2013/0165585 A1 | 6/2013 | Tadepalli et al. |

FOREIGN PATENT DOCUMENTS

| | | |
|---|---|---|
| DE | 10 2011 055 263 A1 | 5/2013 |
| DE | 10 2010 040 027 B4 | 7/2013 |
| EP | 0114971 A2 | 8/1984 |
| EP | 0 144 971 B1 | 3/1988 |
| EP | 0 134 992 B1 | 9/1988 |
| EP | 0 589 640 A1 | 3/1994 |
| EP | 0 655 476 A1 | 5/1995 |
| EP | 0 752 306 A1 | 1/1997 |
| EP | 2 774 944 A1 | 9/2014 |
| JP | 59199863 A | 11/1984 |
| WO | 2011/073200 A1 | 6/2011 |
| WO | 2011/006947 A1 | 9/2012 |
| WO | 2012116947 A1 | 9/2012 |
| WO | 2013/050074 A1 | 4/2013 |

\* cited by examiner

FIBER-CONTAINING PREPREGS AND METHODS AND SYSTEMS OF MAKING

CROSS-REFERENCES TO RELATED APPLICATIONS

This application is a continuation-in-part of U.S. patent application Ser. No. 14/088,034 filed Nov. 22, 2013, entitled "Fiber-Containing Prepregs and Methods and Systems of Making" (the parent application) which is incorporated herein by reference for all purposes.

BACKGROUND OF THE INVENTION

Conventional methods of making fiber-reinforced composites include bringing together a plurality of fibers with a resin composition and shaping the amalgam of fibers and resin composition into the final composite article. The fibers may include glass fibers that are organized into a woven pattern or randomly assembled into a nonwoven collection or mat. The resin composition applied to the fibers may be a powder, a suspension in a liquid medium, or a melt of thermoplastic polymer.

There can be many challenges applying the resin composition to plurality of fibers to make a homogeneous mixture of the fibers and resin composition in the amalgam. For example, when the resin composition is a powder, there is significant difficulty distributing the particles of the powdered composition beyond the surface of the fibers into the bulk. This can be especially challenging for woven fibers that are difficult or impossible to mechanically mix with the particles. Reducing the particle size to allow them to fit through the interstitial spaces between the fibers may help distribute them beyond the service layer, but milling the particles to very small sizes often requires complex and expensive processing. Moreover, fine-grained particles of organic materials mixed in air can create an explosion hazard, and should be applied to the fibers under an inert (i.e., reduced oxygen) atmosphere.

There are also challenges applying liquid resin compositions to fibers. If the liquid resin composition is a melt of thermoplastic polymer, it often has a viscosity significantly higher than water. A high viscosity melt makes the resin material difficult to impregnate into the bulk of the fibers. Increasing the temperature of the melt to reduce its viscosity can cause unwanted reactions or decomposition in the resin material, making this viscosity-reduction technique of limited value. Another technique increases the pressure on the amalgam using a double belt press in order to drive the high-viscosity melt into the fibers. However, this technique is prone to damaging and distorting the fibers, especially fibers that have been fashioned into a woven fabric. In some instances, the resin material can be mixed or dissolved in a solvent to reduce its viscosity and make it easier to wet the fibers. However, many thermoplastic resin materials are not easily dissolved, and additional time and steps may be required to separate (e.g., evaporate) the solvent from the fiber and resin amalgam. Similar problems can occur for resin compositions made of a suspension of particles in a liquid carrier medium such as water. In addition to the challenges getting the particles to quickly and evenly disperse throughout the fibers, additional steps are often needed to remove the solvent from the amalgam.

These and other problems are addressed by the present application, which includes the making and use of prepregs that have a resin material dispersed in a plurality of fibers. The prepregs may be used in fiber-containing composite articles, and reduce or eliminate the number of time-consuming process steps needed to combine resin compositions with the fibers.

BRIEF SUMMARY OF THE INVENTION

Methods and systems for making fiber-reinforced prepregs from reactive fibers and reactive resin compositions are described. The reactive fibers may include one or more agents that facilitate the polymerization of the reactive resin composition and/or bond the polymerized resin to the fibers. The reactive resin composition may include monomers and/or oligomers having a low melt viscosity before they are polymerized. After the reactive fibers and reactive resin composition are combined, they may be cured to polymerize the resin and form the fiber-reinforced prepreg. The polymerized prepregs may be incorporated into a fiber-reinforced composite article, where the prepregs may be heated, pressed or otherwise processed to make the article.

The fiber-reinforced prepregs may include sheets, particles (e.g., pellets), and tapes of glass fibers held together by the resin matrix. The prepregs may be shaped, stacked, assembled, incorporated into a mold, or otherwise processed to form a fiber-reinforced composite article. Using the prepregs may eliminate time-consuming process steps for applying and dispersing resin materials through the fibers during the formation of the fiber-reinforced composite article.

Embodiments may include methods of making a fiber-containing prepreg. The methods may include the steps of providing a plurality of fibers, and applying a reactive resin composition to the plurality of fibers to make a mixture of the plurality of fibers and the resin composition. The reactive resin composition may include at least one of monomers and oligomers capable of polymerizing into a polymerized resin matrix. The mixture may be heated to a polymerization temperature where the monomers, oligomers, or both polymerize to form a fiber-resin amalgam that includes the polymerized resin matrix. The fiber-resin amalgam may be formed into the fiber-containing prepreg.

Embodiments may further include methods of forming a fiber-reinforced composite article. The methods may include providing a plurality of fibers, and applying a reactive resin composition to the fibers in order to make a mixture of the fibers and the resin composition. The reactive resin composition may include monomers and/or oligomers capable of polymerizing into a polymerized resin matrix. The methods may further include heating the mixture to a polymerization temperature in order to polymerize monomers and/or oligomers and form a fiber-resin amalgam and includes the polymerized resin matrix. The fiber-resin amalgam may be formed into at least one fiber-containing prepreg, and the prepreg may be integrated into the fiber-reinforced composite.

Embodiments may still further include fiber-containing prepregs. The prepregs may include a plurality of fibers, and a polymerized resin matrix. The polymerized resin matrix is formed by applying a reactive resin composition to the plurality of fibers, and polymerizing the reactive resin composition into the polymerized resin matrix. The reactive resin composition may include monomers and/or oligomers capable of polymerizing into the polymerized resin matrix Embodiments may yet further include fiber-reinforced composite articles made with the fiber-containing prepregs. At least a portion of the articles include fibers held together in a resin matrix that is supplied by the fiber-containing prepregs. The prepregs themselves include a plurality of fibers and a polymerized resin matrix.

Embodiments may also include methods of making a fiber-containing prepreg. The method may include drawing unsized fibers from a batch of molten glass. The method may also include applying a sizing composition to the unsized fibers to form a plurality of sized fibers, where the sizing composition includes a first polymerization agent for polymerizing caprolactam. The method may further include weaving the plurality of sized fibers into a fabric. Another step may include melting a reactive resin composition to form a melted reactive resin composition, where the reactive resin composition may include caprolactam. The melted reactive resin composition may be applied to the fabric. The method may further include heating the fabric and the melted reactive resin composition to a polymerization temperature, where the caprolactam polymerizes to form a fiber-resin amalgam including a polyamide. Another step may be to form the fiber-resin amalgam into the fiber-containing prepreg.

Embodiments may further include a method of making a fiber-containing prepreg. The method may include applying a reactive resin powder onto a woven fabric. As an example, the reactive resin powder may include caprolactam. Additionally, the woven fabric may include fibers that have been treated with a sizing composition. The sizing composition may include a polymerization agent for polymerizing caprolactam. The method may also include heating the reactive resin powder to a polymerization temperature, where, for instance, the caprolactam polymerizes to form a fiber-resin amalgam. The fiber-resin amalgam may include a polyamide. Another step may include forming the fiber-resin amalgam into the fiber-containing prepreg.

Embodiments may include a method of making a fiber-reinforced composite as well. The method may include drawing an unsized fiber from a batch of molten glass. Sizing composition may be applied to the unsized fiber, where the sizing composition may include at least one polymerization agent for polymerizing caprolactam. A reactive resin composition may be applied to the sized fiber. The reactive resin composition may, for example, include caprolactam. The reactive resin composition may be heated to a polymerization temperature. If the reactive resin composition includes caprolactam, the caprolactam may polymerize to form a fiber-resin amalgam including a polyamide.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present application includes methods of making prepregs having a polymerized resin matrix made from a reactive resin composition that includes monomers and/or oligomers that can polymerize to form the resin matrix. Exemplary prepregs may include a plurality woven or non-woven glass fibers combined with the reactive resin composition that may include a polyalkylene terephthalate precursor such as cyclic butylene terephthalate (CBT), or a polyamide precursor such as caprolactam. In some examples, the plurality of fibers may include reactive glass fibers that contain a polymerization agent to facilitate the polymerization of the reactive resin composition. In a subset of the examples, the polymerization agent may include a coupling moiety that covalently bonds the polymerization agent to the glass fiber, and an initiator moiety that initiates the polymerization of the reactive resin composition. Exemplary prepregs may include sheets that either lay flat or get wound into a cylindrical roll for packaging and transport, and particles (e.g., pellets) that are packaged and shipped as fiber-reinforced thermoplastic starting materials to be cut, shaped, pressed, molded, etc., into a fiber-reinforced composite article.

Exemplary Methods of Making Fiber-Containing Prepregs

Figure 1:
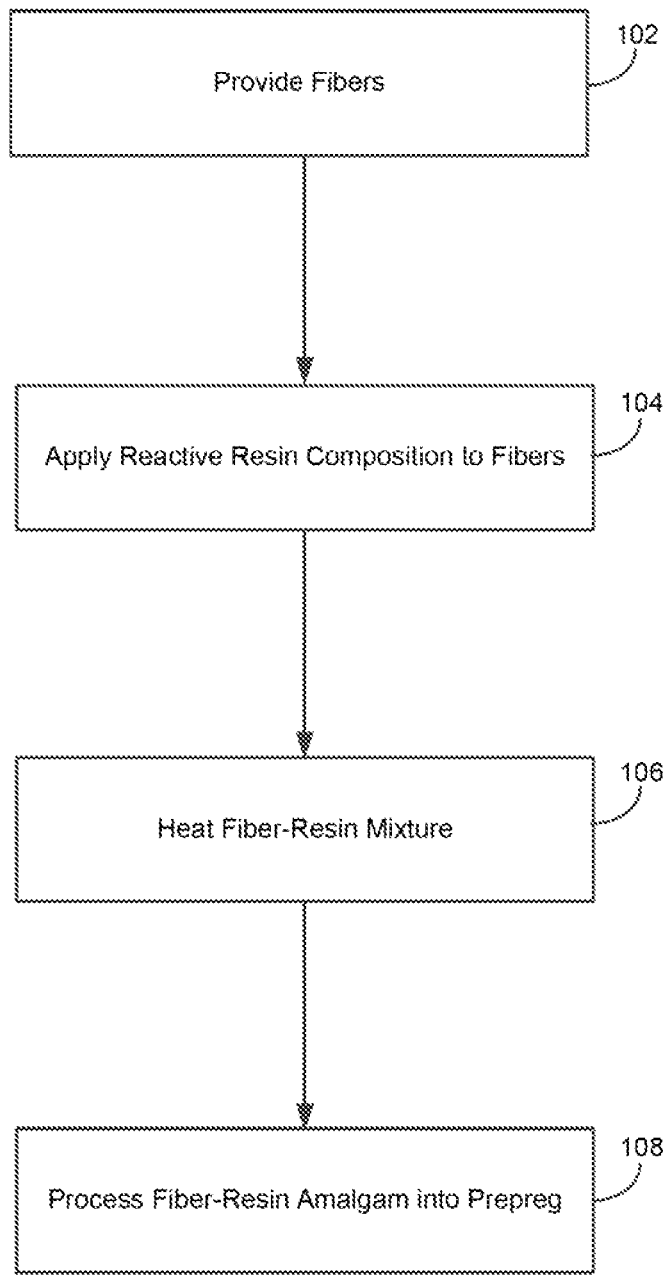
FIG. 1 is a flowchart showing selected steps in a method of making a prepreg according to embodiments of the invention.

FIG. 1 is a flowchart showing an exemplary method 100 of making the fiber-containing prepregs. The method 100 may include providing a plurality of fibers 102 that become the fiber component of the prepreg. A reactive resin composition may be applied to the plurality of fibers 104. The reactive resin composition may be heated to a melting temperature so that it can be applied as a liquid to the plurality of fibers. The melting temperature may be below a polymerization temperature for the reactive resin composition, so that the composition may be applied in a low-viscosity, unpolymerized state that makes it easier to wet and impregnate the plurality of fibers.

When the reactive resin composition is added to the plurality of fibers, they form a mixture that may be heated to a polymerization temperature for the monomers and/or oligomers 106. Polymerizing the resin composition forms a fiber-resin amalgam with the plurality of fibers, and the amalgam may be formed into the fiber-containing prepreg 108. For example, the fiber-resin amalgam may be cooled from the polymerization temperature to a solidification temperature where the resin composition solidifies into the polymerized resin matrix. The solid amalgam of fibers and the polymerized resin matrix may then be cut, chopped, crushed, comminuted, etc., into the fiber-containing prepreg. Additional details of the exemplary method 100 are provided below.

Exemplary Fibers

The fibers may be one or more types of fibers chosen from glass fibers, inorganic fibers, carbon fibers, metal fibers, organic polymer fibers, and mineral fibers, among other kinds of fibers. Exemplary glass fibers may include "E-glass", "A-glass", "C-glass", "S-glass", "ECR-glass" (corrosion resistant glass), "T-glass", and fluorine and/or boron-free derivatives thereof. Exemplary inorganic fibers may include aluminum oxide, silicon carbide, silicon nitride, silicon carbide, and basalt fibers, among others. Exemplary carbon fibers may include graphite, semi-crystalline carbon, and carbon nano tubes, among other types of carbon fibers. Exemplary metal fibers may include aluminum, steel, and tungsten, among other types of metal fibers. Exemplary organic polymer fibers may include poly aramid fibers, polyester fibers, and polyamide fibers, among other types of organic polymer fibers.

The fiber length may range from short-to-intermediate chopped fibers (1 to 100 mm in length) to long fibers, including continuous fibers, rovings, and wound fibers, among others. The plurality of fibers may have an orderly arrangement, such as a woven fiber mat, or may have a non-ordered arrangement such as a nonwoven mat. For example, the fibers may be arranged as a mono-axial and/or multi-axial, woven and/or non-woven, continuous and/or chopped strand mat. The mats may have multiple sections with different weave styles, as well as combinations of woven and non-woven sections. In addition, the mats may have regions where fibers are incorporated, for example to allow better wet out and resin penetration.

In some instances, the plurality of fibers may be treated with a sizing composition that can enhance the fibers' physical characteristics in a number of ways including increased hardness, increased mechanical strength, greater wettability, and increased adhesion between the fibers and resin. The sizing composition may also enhance the chemical reactivity of the fibers by providing them with reactive agents that initiate and/or promote the polymerization of the resin composition that come in contact with the "reactive" fibers. The reactive agents may include coupler-initiator compounds that include a silicon-containing moiety that forms a covalent bond with an exposed surface of the glass fiber, and an initiator moiety that initiates a polymerization reaction in the resin composition that comes in contact with the coupler-initiator compound bound to the glass fiber. In some examples, this initiator moiety is a caprolactam blocked isocyanate moiety that initiates a ring-opening polymerization reaction of caprolactam when the reactive fibers come in contact with caprolactam monomers in the resin composition. Exemplary reactive glass fibers are described in co-assigned U.S. patent application Ser. Nos. 13/335,690; 13/335,761; 13/335,793; and 13/335,813, all filed Dec. 22, 2011, and U.S. patent application Ser. No. 13/788,857, filed Mar. 7, 2013. The entire contents of all the applications are herein incorporated by reference for all purposes.

A polymerization agent may be found exclusively in the reactive fibers, or may be shared between the fibers and the reactive resin composition. Conversely, a polymerization agent may be found exclusively in the reactive resin composition while not being present on the reactive fibers. When multiple polymerization agents are used, some may be present exclusively on the reactive fibers while others are present exclusively in the reactive resin composition. In additional examples, all of the polymerization agents may be shared between the reactive fibers and reactive resin composition.

Exemplary Reactive Resin Compositions

The method 100 may include applying a reactive resin composition to the plurality of fibers 104. The reactive resin composition may include monomers and/or oligomers capable of polymerizing into a polymerized resin matrix that binds the plurality of fibers. Exemplary reactive resin compositions may include caprolactam. Caprolactam is a cyclic amide of caproic acid with an empirical formula $(CH_2)_5C(O)NH$, which may be represented by the structural formula:

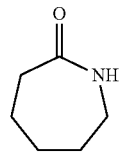

Caprolactam has a low melting point of approximately 68° C. and a melted viscosity (4-8 cP) that is close to water, making it well suited for wetting and impregnating glass fibers. Typically, the caprolactam-containing reactive resin composition may be introduced to the plurality of fibers as a liquid melt, but may also be introduced as a dry powder that is subsequently melted and polymerized around the fibers.

Caprolactam-containing reactive resin compositions may also include polymerization agents such as a caprolactam polymerization catalyst. Exemplary catalysts may include a salt of a lactam, and the salt may be an alkali metal salt, an alkali-earth metal salt, and/or a Grignard salt of the caprolactam. For example the polymerization catalyst may be an alkali metal salt of caprolactam, such as sodium caprolactam. In another example, the polymerization catalyst may be a Grignard salt of the caprolactam, such as a magnesium bromide salt of the caprolactam. As noted in the discussion of reactive glass fibers above, polymerization agents may also be present on the fibers, and in some instances a polymerization agent may be present in both the reactive resin composition and on the fibers. Incorporating a polymerization agent on the reactive glass fibers can reduce or eliminate its presence in the reactive resin composition, which may increase the pot-life of the reactive resin composition prior to being applied to the fibers.

Exemplary reactive resin compositions may include oligomers of a cyclic alkylene terephthalate, such as cyclic butylene terephthalate (CBT). An exemplary CBT, whose ring includes two butyl groups and two terephthalate groups, is illustrated below:

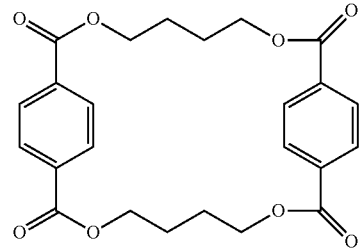 [SMILES: O=C1OCCCCOC(=O)c2ccc(cc2)C(=O)OCCCCOC(=O)c2ccc1cc2]

It should be appreciated that the present CBT may include additional butyl and/or terephthalate groups incorporated into the ring. It should also be appreciated that some exemplary CBT may have other moieties coupled to the CBT ring. CBT may comprise a plurality of dimers, trimers, tetramers, etc., of butylene terephthalate.

CBT resins are typically solids at room temperature (e.g., about 20° C.), and begin to melt at around 120° C. At around 160° C., CBTs are generally fully melted with a liquid viscosity of about 150 centipoise (cP). As the molten CBTs are heated further, the viscosity may continue to drop, and in some instances may reach about 30 cP at about 190° C. The CBT monomers and/or oligomers may be selected to have a melting temperature range of, for example, 120-190° C.

CBT-containing reactive resin compositions may be introduced to the plurality of fibers as a melt or a dry powder of CBT particles. The reactive resin composition may include additional compounds such as polymerization catalysts, polymerization promoters, colorants, flame retardants, ultraviolet stabilizers, and fillers including inorganic particles and carbon nanotubes, among other additional compounds. When the resin particles are oligomers of a CBT, the polymerization catalyst is selected to drive the polymerization of these types of macrocyclic oligoesters. Exemplary polymerization catalysts may include organometallic compounds such as organo-tin compounds and/or organo-titanate compounds. One specific polymerization catalyst for the CBT monomers and oligomers may be butyltin chloride dihydroxide.

The CBT-containing reactive resin composition may also include a polymerization promoter that accelerates the polymerization rate of the monomers and/or oligomers. When the resin particles include CBT, the polymerization promoter may by an alcohol and/or epoxide compound. Exemplary alcohols may include one or more hydroxyl groups, such as mono-alcohols (e.g., butanol), diols (e.g., ethylene glycol, 2-ethyl-1,3-hexanediol, bis(4-hydroxybutyl)terephthalate), triols, and other polyols. Exemplary epoxides may include one or more epoxide groups such as monoepoxide, diepoxide, and higher epoxides, such as bisphenol A diglycidylether. They may also include polyol and polyepoxides, such as poly(ethylene glycol).

Exemplary Reactive Resin Combinations

The reactive resin compositions may include a single type of monomer and/or oligomer such as caprolactam or CBT, or alternatively may include two or more types of monomers and/or oligomers. For example, the reactive resin composition may include both caprolactam and CBT. In some examples, the combination of monomers/oligomers may be selected to form a melt suspension of higher melting point monomers/oligomers in a liquid medium made from a lower melting point monomer/oligomer. For example, a combination of caprolactam and CBT may be selected with CBT monomer/oligomers having melting points significantly above the melting point of caprolactam. When this reactive resin combination is heated above the melting point of the caprolactam it forms a liquid medium in which the CBT particles are suspended. The application of this reactive resin suspension on a glass fiber substrate can create a inhomogeneous distribution of the two types of monomers/oligomers in the resin-fiber mixture. This can be beneficial for prepreg designs where a higher resin density is desired on or near the surface of the prepreg.

Additional reactive resin compositions include combinations of first and second resin systems having different polymerization temperatures. This may allow the formation of a semi-reactive prepreg that contains a polymerized resin matrix of the first resin system having a lower polymerization temperature, while also containing unpolymerized monomers/oligomers of the second resin system having a higher polymerization temperature. For example, a reactive resin combination of caprolactam and CBT may be selected such that the CBT has a higher polymerization temperature than the caprolactam. Alternatively, a reactive resin combination can be formulated of two different types of cyclic alkylene terephthalates and/or a bimodal molecular weight distribution of CBT oligomers having different polymerization temperatures.

A bimodal or multi-modal distribution of oligomer/polymer melting points in the prepreg can be advantageous to the final molded product that incorporates the prepreg. For example, the low molecular weight (low melting temperature) component of the prepreg may melt and flow easily in the interstitial spaces between the plurality of fibers, while the high molecular weight (high melting temperature) component(s) may hold tighter to the fibers preventing an inhomogeneous distribution of resin across the fiber-reinforced article. These bimodal or multimodal distributions of resin melting temperatures in the prepreg can be useful for making fiber-reinforced articles with a high weight (i.e., loading) of the resin relative to the weight of the fibers (i.e., a high resin-to-fiber loading ratio).

Exemplary Techniques for Adding the Reactive Resin Compositions to the Fibers

The reactive resin composition may be added to the plurality of fibers using a variety of application techniques depending on whether the reactive resin composition is a melt or powder. For example, when the resin composition is a melt of monomers and/or oligomers, they may be applied to the fibers by spraying, curtain coating, kiss rolling, doctor blade coating, sheet die coating, and dip and squeeze coating, among other techniques. If the resin composition is a dry powder, techniques for applying the powders to the plurality of fibers may include fluidized bed applications, powder scattering, and powder spraying, among others.

Heating the Fiber-Resin Mixture

After the reactive resin composition has been added to the plurality of fibers, the fiber-resin mixture may be heated to a polymerization temperature at which the monomers and/or oligomers start to polymerize. For a reactive resin composition that includes caprolactam monomers, the polymerization temperature may be about 120° C. or more (e.g., about 120° C. to about 220°). A reactive resin composition that includes CBT may have a more variable threshold polymerization temperature depending on the CBT oligomers present. Typically, threshold polymerization temperature for reactive resin compositions including CBT range from about 170-190° C. For prepreg manufacturing processes where the polymerized resin matrix is not melted, an upper limit on the polymerization temperature for the monomers and/or oligomers may be the melting temperature of the polymer. For example, a reactive resin composition that includes caprolactam may have a upper limit of a polymerization temperature that is the melting temperature of the PA-6 polymer formed by the caprolactam (i.e., ~220° C.). Similarly, a reactive resin composition that includes CBT may have an upper limit of a polymerization temperature that is the melting temperature of the PBT polymers it forms (e.g., about 225° C.).

As noted above, when the reactive resin composition is a combination of two or more types of reactive monomers and/or oligomers, the heating temperature of the resin-fiber mixture may be chosen to be above a threshold polymerization temperature of one type of monomer/oligomer but below a threshold polymerization temperature of the other type of monomer/oligomer. For example, a reactive resin composition that includes both caprolactam and CBT monomers and/or oligomers may be heated to 120-170° C., which may polymerize the caprolactam to PA-6 without significantly polymerizing the CBT to PBT. The resulting fiber-resin amalgam will include a polymerized resin matrix of PA-6 combined with a polymerizable resin of CBT. The fiber-resin amalgam may be processed into a reactive prepreg that includes a polymerized resin matrix of PA-6 and pre-polymerized CBT. The reactive prepreg may be incorporated into a fiber-reinforced article, where the processing conditions may include polymerizing the CBT into PBT.

Processing the Fiber-Resin Amalgam into a Prepreg

The heat curing of the monomers and/or oligomers form a fiber-resin amalgam of the plurality of fibers and the polymerized resin matrix. Initially, the polymerized resin matrix may be close to or above the polymer melting temperature, and the fibers and matrix may be blended, pressed, and/or extruded into the rough shape of the fiber-containing prepreg. Alternatively, the fiber-resin amalgam may be cooled below the melting temperature of the polymerized resin matrix causing the amalgam to solidify. The solidification of the fiber-resin amalgam does not necessarily create an inflexible and brittle prepreg. The polymerized resin matrix may be selected to form a flexible layer of the prepreg material that can be flexed or bent without cracking, fracturing, or flaking.

Exemplary Methods of Making Fiber-Reinforced Composite Articles

Figure 2:
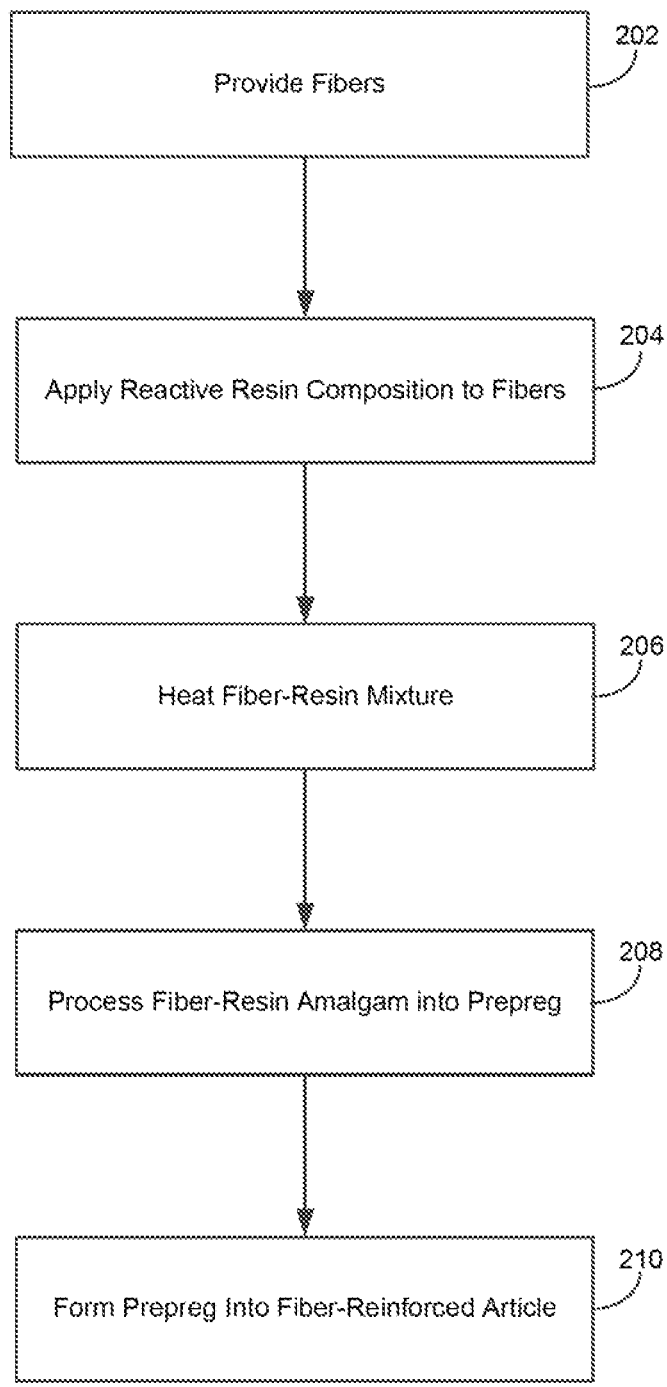
FIG. 2 is a flowchart showing selected steps in a method of making a fiber-reinforced article according to embodiments of the invention.

FIG. 2 is a flowchart showing an exemplary method 200 of making the fiber-reinforced composite articles. The method 200 may include providing a plurality of fibers 202 that become the fiber component of a prepreg that is incorporated into the article. A reactive resin composition may be applied to the plurality of fibers 204. The reactive resin composition may include monomers and/or oligomers capable of polymerizing into a resin matrix under the appropriate curing conditions. The addition of the reactive resin composition to the plurality of fibers forms a fiber-resin mixture that is heated to a polymerization temperature of the resin composition 206. The heating facilitates the polymerization of the monomers and/or oligomers in the reactive resin composition, and creates a fiber-resin amalgam from the plurality of fibers held by the polymerized resin matrix. The amalgam may then be processed into the fiber-containing prepregs 208, and the prepregs may then be formed into the fiber-reinforced composite article 210 by incorporating them into the article.

Exemplary techniques for forming the prepregs into the fiber-reinforced composite articles may include compression molding of a single prepreg layer, multiple prepreg layers, and/or pellets of prepreg material into the fiber-reinforced article. When the prepreg includes pre-polymerized and/or partially-polymerized resin, the compression molding process may include a heating step (e.g., hot pressing) to fully polymerize the resin. Heat may also be used in the compression molding of fully-polymerized prepregs to melt and mold the prepreg into the shape of the final article.

The prepregs may also be used to in conjunction with other fibers and resin materials to make the final composite article. For example, the prepreg may be placed in selected sections of a tool or mold to reinforce the article and/or provide material in places that are difficult to reach for thermoset and/or thermoplastic resins. For example, the prepregs may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VARTM), spray-up forming processes, filament winding processes, long-fiber injection molding processes, and pultrusion, among others.

As noted above, examples of the present prepregs may include a resin matrix of polymerized PA-6 and unpolymerized or partially polymerized CBT. The pre-polymerized or partially polymerized CBT can be converted to PBT and form a fully-polymerized fiber-reinforced article under isothermal processing conditions.

Exemplary Fiber-Containing Prepregs

Figure 3A:
FIGS. 3A-C show exemplary prepregs made according to present methods.
Figure 3B:
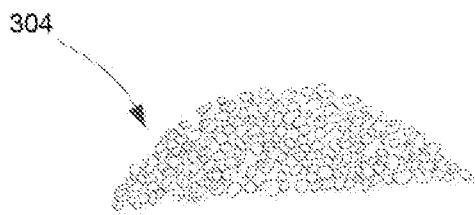
Figure 3C:
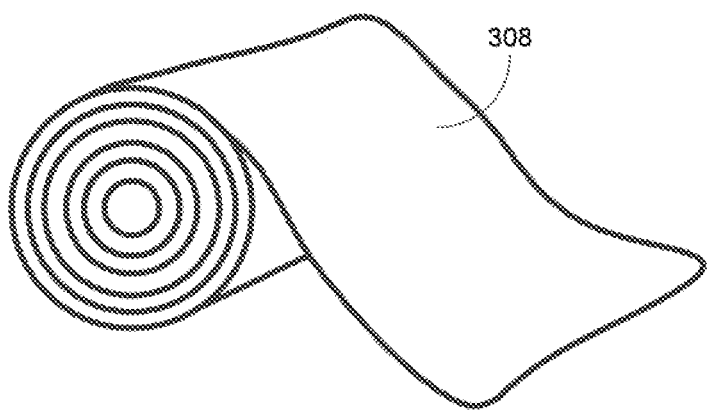

FIGS. 3A-C show some exemplary prepregs made using the present methods. FIG. 3A shows a sheet 302 of woven glass fabric and polymerized resin. In some instances, a plurality of prepreg sheets 302 may be stacked directly on top of each other, or sandwiched between other layers of materials. Additional details about arranging a plurality of prepreg layers in a layup for the fiber-reinforced composite article can be found in co-assigned U.S. patent application Ser. No. 13/915,023, filed Jun. 11, 2013, the entire contents of which are herein incorporated by reference for all purposes.

FIG. 3B shows a pile of prepreg pellets 304 that may be formed by chopping, grinding, milling, crushing, or otherwise comminuting the heated fiber-resin amalgam. The heated fiber-resin amalgam may be cooled to a comminuting temperature, which may be a temperature at or below the glass transition temperature for the resin materials in the prepreg. The prepreg pellets 304 may be added as a dry powder or as a component of a liquid suspension to the final fiber-reinforced composite article.

FIG. 3C shows a roll 308 of prepreg material that may be used as sheet molding compound (SMC), among other applications. In some embodiments, the prepreg material may be sandwiched between film layers that prevent contamination of the prepreg as well as the bonding of adjacent layers on the roll. The film layers are selected to easily peel away from the prepreg when it is ready to be used in making fiber-reinforced articles. Alternatively, the film layers may be compatible with the prepreg, and incorporated in the composite part after molding.

Exemplary Fiber-Reinforced Composite Articles

Figure 4:
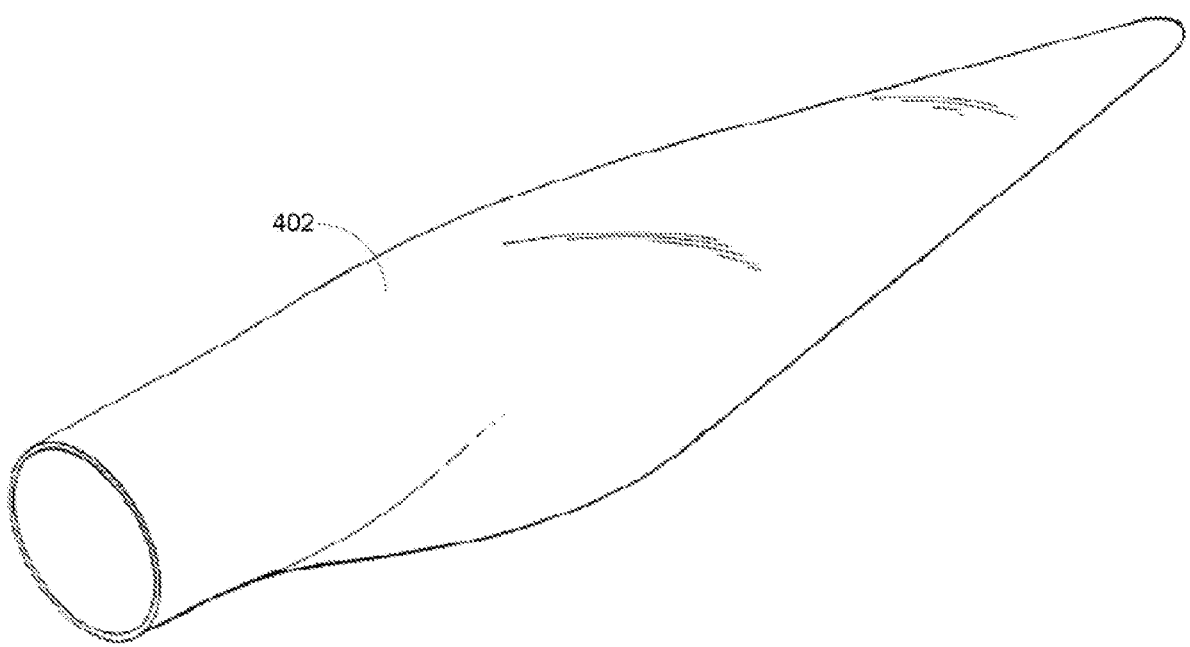
FIG. 4 shows an exemplary fiber-reinforced article made according to the present methods.

FIG. 4 shows an exemplary fiber-reinforced composite wind turbine blade 502 formed by the present prepregs. The blade 402 is one of many types of articles that can be formed by the present prepregs. Other articles may include vehicle parts (e.g., aircraft parts, automotive parts, etc.), appliance parts, containers, etc.

Additional Exemplary Methods

Figure 5:
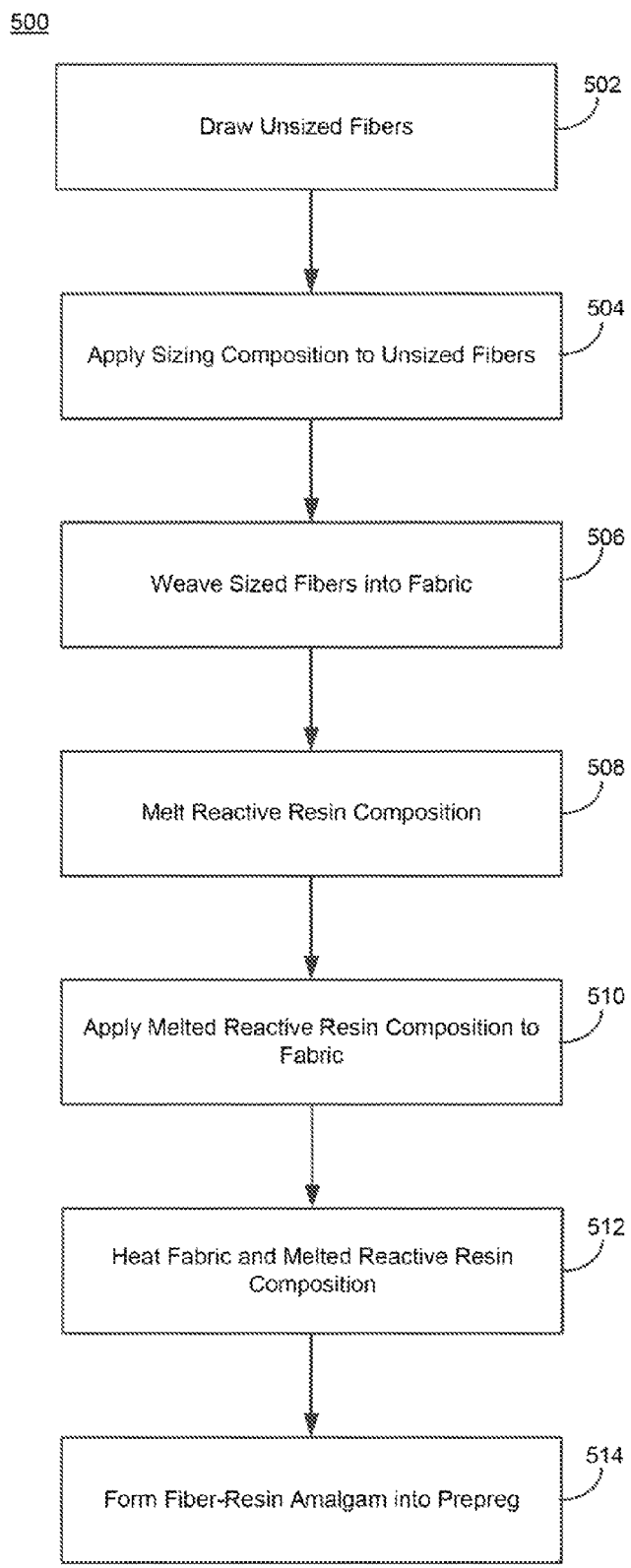
FIG. 5 is a flowchart showing selected steps in a method of making a prepreg according to embodiments of the invention.

FIG. 5 is a flowchart showing an exemplary method 500 of making a fiber-containing prepreg. Method 500 may include drawing unsized fibers 502 through bushing from a batch of molten glass. The unsized fibers may be cooled by a mist of water. Method 500 may also include applying a sizing composition to the unsized fibers 504 to form a plurality of sized fibers, where the sizing composition includes a first polymerization agent for polymerizing caprolactam. The first polymerization agent may also include a coupling moiety that covalently bonds the polymerization agent to the unsized fibers. The polymerization agent may include a silane moiety. In addition, the first polymerization agent may include a polymerization initiator or catalyst. The polymerization agent may further include an initiator moiety that initiates polymerization of the reactive resin composition. For example, the initiator moiety may initiate the polymerization of caprolactam. Possibly as a result of the structure of the first polymerization agent, applying the sizing composition to the unsized fibers 504 may include covalently bonding the first polymerization agent to the unsized fibers. Steps 502, 504, and 506 may occur at the same facility.

Applying a polymerization agent, such as an initiator, to the fibers as they are being formed may provide advantages over applying the polymerization agent to fibers that have already been sized. Sizing compositions often may be applied to fibers in order to minimize abrasion between fibers. These sizing compositions often include a lubricant and/or a film former and may coat the surface of the glass fibers. An already sized fiber may then inhibit or prevent adhesion between the polymerization agent and the surface of the glass fibers. The sizing composition, if applied before the polymerization agent, may coat the glass fibers and compromise the surface of the glass fibers so that a polymerization agent may not readily adhere to the surface. Applying the sizing composition containing a polymerization agent directly to the fibers as they are being formed also may decrease the number of processing steps and may decrease costs.

The plurality of sized fibers may be woven into a fabric as in step 506. Another step may include melting a reactive resin composition as in step 508 to form a melted reactive resin composition, where the reactive resin composition may include caprolactam. The reactive resin composition may include a second polymerization agent. This second polymerization agent may assist in polymerizing caprolactam. The second polymerization agent may include an initiator or catalyst. The initiator in the second polymerization agent may be different from the initiator in the first polymerization agent. An initiator that may be present in the first polymerization agent may not be present in the second polymerization agent. Similarly, an initiator that may be present in the second polymerization agent may not be present in the first polymerization agent. The plurality of fibers may be continuous and not chopped.

The melted reactive resin composition may be applied to the fabric 510. This may result in a fabric impregnated with the resin composition. Method 500 may further include heating the fabric and melted reactive resin composition 512 to a polymerization temperature, where the caprolactam polymerizes to form a fiber-resin amalgam including a polyamide. Another step may be to form the fiber-resin amalgam into the fiber-containing prepreg 514.

Figure 6:
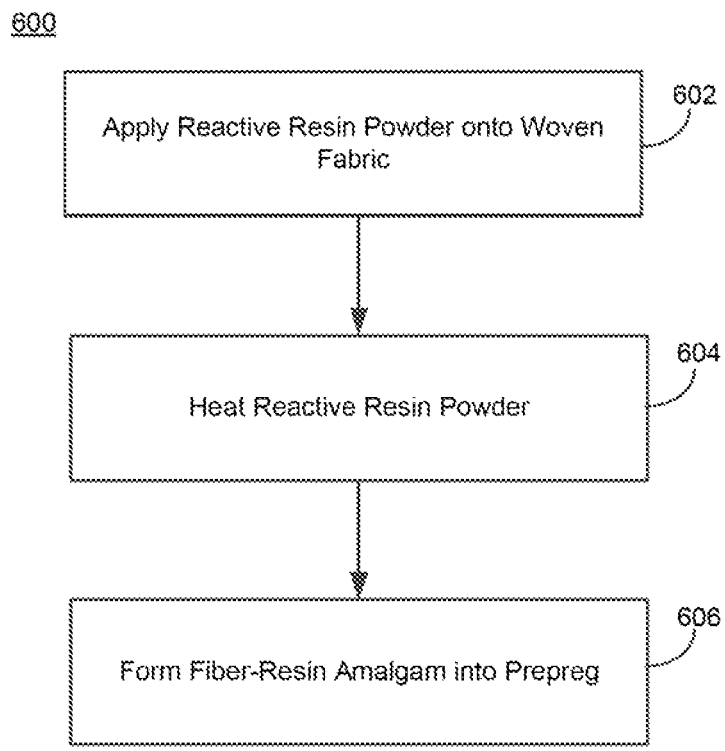
FIG. 6 is a flowchart showing selected steps in a method of making a prepreg according to embodiments of the invention.

FIG. 6 is a flowchart showing an exemplary method 600 of making a fiber-containing prepreg. Method 600 may include applying reactive resin powder onto a woven fabric 602. The reactive resin powder may include caprolactam, and the woven fabric may include fibers that have been treated with a sizing composition. The sizing composition may be any sizing composition previously discussed. The woven fabric may be formed by drawing unsized fibers from a batch of molten glass, then applying the sizing composition to the unsized fibers to form a plurality of sized fibers, and weaving the plurality of sized fibers into the woven fabric. The plurality of fibers may be produced by a direct roving process. The sizing composition may include a polymerization agent. As an example, the reactive resin powder may include caprolactam. The reactive resin powder may include an initiator or catalyst. The reactive resin powder may then be melted.

Method 600 may also include heating the reactive resin powder 604 to a polymerization temperature, where, for instance, the caprolactam polymerizes to form a fiber-resin amalgam. The fiber-resin amalgam may include a polyamide. Another step may include forming the fiber-resin amalgam into the fiber-containing prepreg 606.

Figure 7:
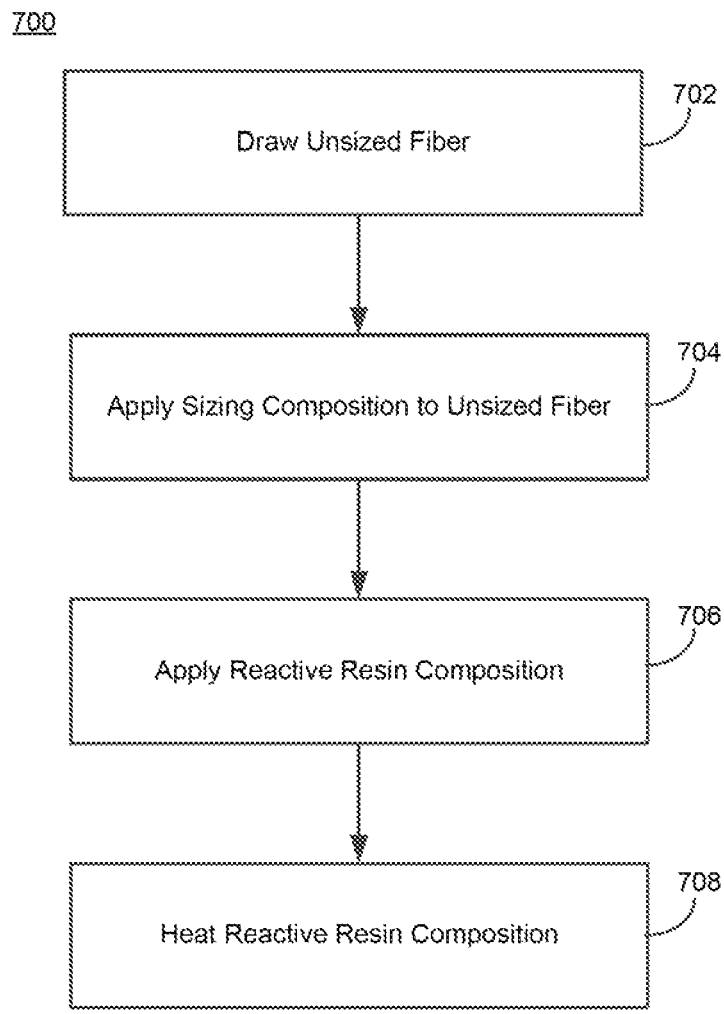
FIG. 7 is a flowchart showing selected steps in a method of making a fiber-reinforced composite according to embodiments of the invention.

FIG. 7 is a flowchart showing an exemplary method 700 of making a fiber-reinforced composite. Method 700 may include drawing an unsized fiber 702 through bushing from a batch of molten glass. Sizing composition may be applied to the unsized fiber 704, where the sizing composition may include at least one polymerization agent for polymerizing caprolactam. The at least one polymerization agent may be any polymerization agent previously described.

A reactive resin composition may be applied 706 to the sized fiber. The reactive resin composition may be applied to several sized fibers simultaneously or nearly simultaneously. These sized fibers may be in a tow, which may include thousands of fibers. The fibers may be the same or different in material or diameter. The reactive resin composition may, for example, include caprolactam. The reactive resin may also include a polymerization initiator or a polymerization catalyst or both an initiator and a catalyst. The reactive resin, when applied to the sized fiber, may be in a powder form. Or the reactive resin may be melted when applied to the sized fiber. The reactive resin composition may be applied to the sized fiber in a pultrusion process. The reactive resin composition may be heated 708 to a polymerization temperature. If the reactive resin composition includes caprolactam, the caprolactam may polymerize to form a fiber-resin amalgam including a polyamide.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a fiber-containing prepreg, the method comprising:
    drawing unsized fibers from a batch of molten glass;
    applying a sizing composition to the unsized fibers to form a plurality of sized fibers, wherein:
        the sizing composition comprises a first polymerization agent,
        the first polymerization agent comprises a first polymerization initiator, and
        the first polymerization initiator comprises an initiator moiety that can initiate the polymerization of caprolactam;
    weaving the plurality of sized fibers into a fabric;
    melting a reactive resin composition to form a melted reactive resin composition, wherein the reactive resin composition comprises caprolactam, wherein:
        the reactive resin composition comprises a second polymerization agent,
        the second polymerization agent comprises a second polymerization initiator, and
        the second polymerization initiator comprises an initiator moiety that can initiate the polymerization of caprolactam;

applying the melted reactive resin composition to the fabric;

heating the fabric and the melted reactive resin composition to a polymerization temperature, wherein the caprolactam polymerizes to form a fiber-resin amalgam comprising a polyamide; and forming the fiber-resin amalgam into the fiber-containing prepreg.

2. The method of making a fiber-containing prepreg of claim 1, wherein the first polymerization agent comprises a coupling moiety that covalently bonds the first polymerization agent to the unsized fibers.

3. The method of making a fiber-containing prepreg of claim 2, wherein the first polymerization agent comprises a silane moiety.

4. The method of making a fiber-containing prepreg of claim 1, wherein the first polymerization agent is different from the second polymerization agent.

5. The method of making a fiber-containing prepreg of claim 1, wherein the first polymerization agent comprises an initiator moiety that initiates polymerization of caprolactam.

6. The method of making a fiber-containing prepreg of claim 1, wherein applying the sizing composition to the unsized fibers comprises covalently bonding the first polymerization agent to the unsized fibers.

7. The method of making a fiber-containing prepreg of claim 1, wherein the first polymerization initiator is different from the second polymerization initiator.

8. The method of making a fiber-containing prepreg of claim 1, wherein the reactive resin composition further comprises a polymerization catalyst.

9. The method of making a fiber-containing prepreg of claim 1, wherein the sizing composition does not include the second polymerization initiator.

10. A method of making a fiber-reinforced composite, the method comprising:

drawing an unsized fiber from a batch of molten glass;

applying a sizing composition to the unsized fiber to form a sized fiber, wherein:

the sizing composition comprises a first polymerization agent, the first polymerization agent comprises a first polymerization initiator, and the first polymerization initiator comprises an initiator moiety that can initiate the polymerization of caprolactam;

applying a reactive resin composition to the sized fiber, wherein:

the reactive resin composition comprises caprolactam and a second polymerization agent, the second polymerization agent comprises a second polymerization initiator, and the second polymerization initiator comprises an initiator moiety that can initiate the polymerization of caprolactam; and heating the reactive resin composition to a polymerization temperature, wherein the caprolactam polymerizes to form a fiber-resin amalgam comprising a polyamide.

11. The method of making a fiber-reinforced composite of claim 10, wherein the reactive resin composition further comprises a polymerization catalyst.

12. The method of making a fiber-reinforced composite of claim 10, wherein applying the reactive resin composition comprises applying a reactive resin powder to the sized fiber.

13. The method of making a fiber-reinforced composite of claim 10, wherein applying the reactive resin composition comprises applying a melted reactive resin composition to the sized fiber.

14. The method of making a fiber-reinforced composite of claim 13, wherein the first polymerization agent comprises a silane moiety.

15. The method of making a fiber-reinforced composite of claim 10, wherein applying the reactive resin composition to the sized fiber further comprises applying the reactive resin composition to the sized fiber in a pultrusion process.

16. The method of making a fiber-reinforced composite of claim 10, wherein the first polymerization agent is different from the second polymerization agent.

* * * * *